Jan. 22, 1957  P. FLEISCHER  2,778,701
FRICTIONAL FASTENING METHOD AND DEVICE
Filed June 3, 1952
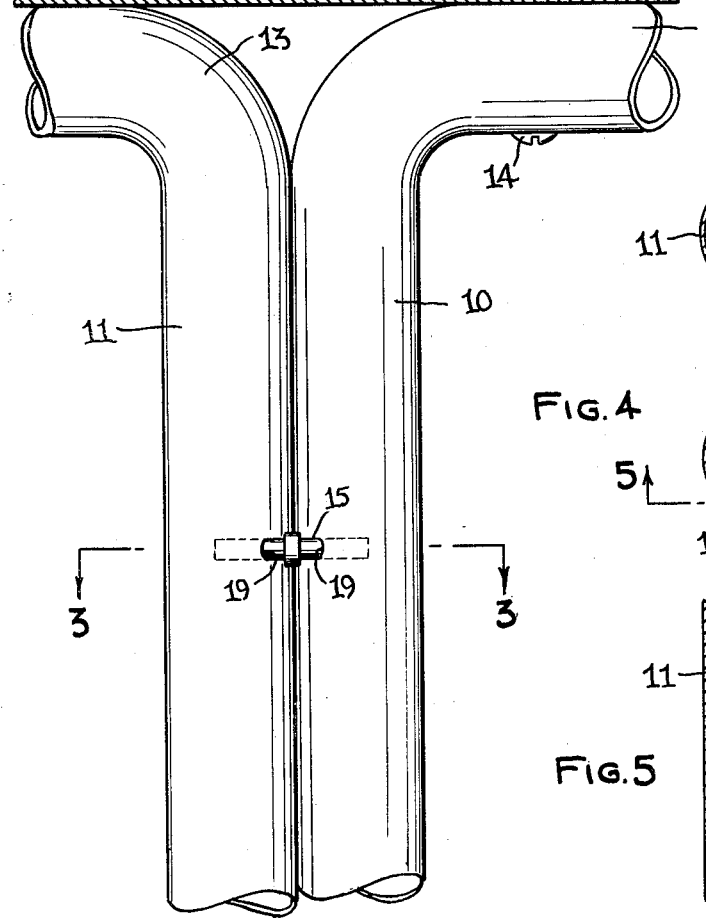
INVENTOR.
PAUL FLEISCHER
BY Isler & Ornstein
ATTORNEYS.

United States Patent Office 2,778,701
Patented Jan. 22, 1957

2,778,701
FRICTIONAL FASTENING METHOD AND DEVICE

Paul Fleischer, University Heights, Ohio, assignor to Fred Ornstein, Cleveland, Ohio Application June 3, 1952, Serial No. 291,525

11 Claims. (Cl. 311—109)

The present invention relates generally to a fastener, and more particularly to a method of frictionally joining tubular parts in side-by-side relationship.

In joining tubular parts, much difficulty has been encountered in joining the parts securely in side-by-side relationship without at the same time disturbing the ornamental appearance of the parts.

For example, in the furniture industry, chromium plated tubing is used widely in kitchen and outdoor furniture. Such tubing is used variously for the legs and frame members of the furniture pieces. When two tubes are to be joined in side-by-side relationship, present fastening methods leave little choice. Either the tubing can be joined by means of a bolt and nut, or, it may be joined by welding.

Both of these methods are undesirable from the standpoint of appearance. The bolt and nut have portions which project from the tubing and give it an unworkmanlike appearance. Welding cannot be accomplished without affecting the chromium plating, causing spattering and black areas.

It is a primary object of my invention to provide fastening means for joining tubular parts in side to side relationship, which will not interfere with the appearance of the joined parts.

Another object of my invention is to provide fastening means of the character described which will permit a substantial economy to be effected in joining such parts.

Other objects and advantages of my invention will be apparent during the course of the following description. In the accompanying drawings forming a part of this specification and in which like numerals are employed to designate like parts throughout the same, Fig. 1 is a fragmentary top plan view of a furniture piece embodying the features of my invention;

Fig. 2 is a cross-sectional view taken on line 2—2 of Fig. 1, showing the appearance of the joined tubular parts in accordance with my invention;

Fig. 3 is a transverse cross-sectional view taken on line 3—3 of Fig. 2 and showing the tubular parts in loosely assembled position;

Fig. 4 is a cross-sectional view similar to Fig. 3 but showing the parts in secured position;

Fig. 5 is a fragmentary longitudinal cross-sectional view taken on line 5—5 of Fig. 4;

Fig. 6 is a cross-sectional view of the fastening elements taken on line 6—6 of Fig. 5;

Fig. 7 is a front elevation of a modified form of fastening element made in accordance with my invention, and Fig. 8 is a front elevation of still another modification of my invention.

Referring now more particularly to the drawings, I have shown in Fig. 1 a table having a top T with ornamental molding M extending around the periphery thereof. The table top T is supported above floor level by means of tubular legs 10 and 11 which are joined in side-by-side relationship. The leg 10 has a right angular bend at its upper extremity, providing a lateral extension 12. The leg 11 has a similarly formed lateral extension 13.

The portions 12 and 13 of the legs 10 and 11, respectively, may be fastened or secured to the underside of the table top T in any suitable manner, as by screws 14. Instead of joining the legs 10 and 11 along their length by welding or by means of stove bolts or the like, my invention contemplates a method of fastening which utilizes a fastener 15. The rod or fastener 15 may be cylindrical in form, having portions 16 and 17 which extend from either side of a portion 18 which is of larger diameter than the adjoining portions 16 and 17.

As best seen in Figs. 3 and 4, each of the tubes 10 and 11 is provided with an aperture or opening 19 into which the portions 16 and 17 of the fastener 15 extend. It will be noted that the fastener 15 is not disposed diametrically of the tubes 10 and 11, but instead, extends chordally thereof, and the apertures 19 are so disposed and aligned as to receive the portions 16 and 17 of the fastener in this chordal position.

When the parts 10 and 11 are first assembled, the fastener 15 is loosely mounted in one of the openings 19, the central enlarged portion 18 of the fastener serving to position the fastener so that not more than half thereof will project into the tube. This, for example, could be the portion 17 extending into the tube 10. The portion 18 also serves to prevent the fastener 15 from slipping completely through the opening 19. The second tube 11 is then mounted on the portion 16 of the fastener 15 so that portion 16 projects into the tube 11 through opening 19, as shown in Fig. 3.

The openings 19 are placed or positioned in the tubes 10 and 11 in such a manner that the angle between the parts 12 and 13 of the tubes, when the tubes are loosely assembled as in Fig. 3, is less than the angle between the parts 12 and 13 when they are secured to the table top T.

After the tubes have been assembled as aforesaid, the legs 10 and 11 are ready to be secured to the table top. In so doing, the angularity between the parts 12 and 13 is increased slightly so that the apertures 19 assume the position shown in Fig. 4. In this position the effective diameter of the openings 19 has been decreased with respect to the portions 16 and 17 of fastener 15, so that the fastener is gripped tightly by the edges of the openings due to their increased angularity with respect to each other. If the parts 12 and 13 are now secured to the table top T by means of the screws 14, the legs 10 and 11 are frictionally locked to each other by the fastener 15. It will be understood that several of the fasteners 15 may be used in spaced relationship to each other, the number being dependent upon the length of the tubes being joined.

Thus by rotating the tubes 10 and 11 slightly, so that the apertures 19 are moved from a position of chordal alignment to one of misalignment, the fastener 15 is gripped by the edges of the openings. If the openings 19 and the rod 15 were aligned diametrically with respect to the tubes 10 and 11, it would require a greater degree of relative angular rotation of the tubes to effect the gripping action. By disposing the fastener 15 and the openings 19 in chordal alignment, the sensitivity of the gripping action is increased.

In Fig. 7 and Fig. 8 are shown modified forms of the fastener 15. Fig. 7 discloses a fastener having the portions 16a and 17a thereof knurled thereby providing a roughened surface 20 for the fastener 15a.

In Fig. 8 is shown a fastener 15b in which the portions 16b and 17b are provided with circumferential grooves 21 to create a roughened or a gripping surface on the fastener.

It has been found that the roughened surfaces such as are shown in Figs. 7 and 8, prevent the fastener from slipping out of the aperture 19 at the time of assembly, before the tubes are locked together.

While I have herein described the fastener as including a central portion 18 of enlarged diameter, it will be understood that the portion 18 serves only as an abutment in positioning the fastener 15 between the tubes 10 and 11, and has no gripping function.

It will thus be seen from the foregoing description that I have provided a method of joining tubes in side-by-side relationship which eliminates the need for welding and represents a considerable economic advantage in labor over bolt and nut assembly. In addition, the fastening element used is concealed from normal view so that the external appearance of the tubes does not disclose the presence of the fastening element.

It is to be understood that the form of my invention, herewith shown and described, is to be taken as a preferred example of the same, and that various changes in the shape, size, and arrangement of parts may be resorted to, without departing from the spirit of my invention, or the scope of the subjoined claims.

Having thus described my invention, I claim:

1. A method of securing hollow structural members in substantially contiguous relationship, comprising the steps of perforating the wall of each of a pair of members, positioning said members to bring said perforations into alignment, inserting a rod within said perforations to bridge said members, and rotating one of said members axially to misalign said perforations into gripping relationship to said rod.

2. A method of securing tubular members in side-by-side relationship, comprising the steps of perforating the wall of each of a pair of members, slidably inserting a rigid fastening element through said perforations to bridge said members, and rotating one of said members axially relatively to the other until the edges of said perforations grip said fastening element.

3. A method of securing tubular members in side-by-side relationship, comprising the steps of perforating each of a pair of members in a plane normal to the longitudinal axis of the member, aligning said perforations, slidably inserting a rod in said perforations to bridge said members, and applying a relative twisting movement to said members to misalign said perforations until said rod is frictionally gripped by the walls of said members.

4. Means for securing a pair of hollow structural members in substantially contiguous relationship, comprising two hollow structural members, each of said members having an aperture in the wall thereof, and a fastener element extending longitudinally through said apertures into each of said members, the longitudinal axis of said fastener element being disposed at an acute angle to the axis of each of said apertures sufficient to cause said element to be frictionally gripped by edge portions of each of said apertures.

5. Means for securing a pair of hollow structural members in side-by-side relationship, comprising two hollow structural members, each of said members having an aperture in the wall thereof, and a fastener element extending longitudinally through said apertures and bridging said members, the portion of said element disposed within either of said members being of smaller cross-sectional dimension than the aperture traversed by said portion, and the longitudinal axis of said element being disposed at an acute angle to the axes of said apertures sufficient to cause said element to be frictionally gripped between edge portions of each of said apertures.

6. Means for securing a pair of hollow structural members in substantially contiguous relationship, comprising two hollow structural members, each of said members having an aperture in the wall thereof, the axis of each aperture lying substantially in a radial plane relatively to the longitudinal axes of said members, and a fastener element traversing said apertures, the longitudinal axis of said element being disposed at an acute angle to the axis of each of said apertures sufficient to cause said element to be frictionally gripped between edge portions of each of said apertures.

7. Means for securing a pair of tubular members in side-by-side relationship, comprising two tubular members each having an aperture in the wall thereof, and a rigid fastener element extending longitudinally through said apertures to bridge said members, the longitudinal axis of said element being disposed at an acute angle to the axis of each of said apertures sufficient to clamp said element between edge portions of said apertures.

8. Means, as defined in claim 7, wherein the portion of said element disposed internally of either of said members is of smaller cross-sectional dimension than the aperture traversed by said portion.

9. Means, as defined in claim 8, wherein said fastener element is a cylindrical rod having oppositely disposed extensions of reduced diameter.

10. A supporting leg structure of the character described, comprising a pair of tubular members disposed in side-by-side relationship, each of said members having an aperture in the wall thereof, a rigid fastener element extending through said apertures, the longtitudinal axis of said element being retained at an acute angle relatively to the axes of said apertures sufficient to cause said element to be gripped between edge portions of each of said apertures, and means for retaining said members in said gripping relationship to said element.

11. A method of securing hollow structural members in substantially contiguous relationship, comprising the steps of perforating the wall of each of said members, positioning said members to axially align the perforation in one of said members with the perforation in another of said members, inserting a rigid element into said aligned perforations to bridge said members, and moving one of said members relatively to said other member to misalign said perforations into gripping relationship with said element.

References Cited in the file of this patent

UNITED STATES PATENTS

| | | |
|---|---|---|
| 660,308 | Pixley | Oct. 23, 1900 |
| 2,291,795 | Colt | Aug. 4, 1942 |
| 2,380,287 | Baumbach | July 10, 1945 |
| 2,464,743 | Evans | Mar. 15, 1949 |
| 2,596,320 | Witte | May 13, 1952 |
| 2,614,827 | Peach et al. | Oct. 21, 1952 |
| 2,665,927 | Becker | Jan. 12, 1954 |

FOREIGN PATENTS

| | | |
|---|---|---|
| 892,038 | France | Jan. 3, 1944 |